United States Patent
Rädlinger et al.

(10) Patent No.: US 6,554,539 B1
(45) Date of Patent: Apr. 29, 2003

(54) METHOD FOR LAYING PIPES FOR FLUID UNDER HIGH PRESSURE

(75) Inventors: Josef Rädlinger, Cham (DE); Walter Weiss, Pösing (DE); Frank Heinze, Königs-Wusterhausen (DE); Frank-Michael Kopping, Leipzig (DE)

(73) Assignees: Radlinger Maschinen-und Anlagenbau GmbH, Cham-Windischbergerhof (DE); VNG-Verbuhdbetz Gas AG, Leipzig (DE)

( * ) Notice: Subject to any disclaimer, the term of this patent is extended or adjusted under 35 U.S.C. 154(b) by 0 days.

(21) Appl. No.: 09/623,144
(22) PCT Filed: Mar. 9, 1999
(86) PCT No.: PCT/EP99/01526
§ 371 (c)(1), (2), (4) Date: Feb. 8, 2001
(87) PCT Pub. No.: WO99/46533
PCT Pub. Date: Sep. 16, 1999

(30) Foreign Application Priority Data

Mar. 10, 1998 (DE) .......................................... 198 10 373

(51) Int. Cl.$^7$ ............................................. F16L 55/165
(52) U.S. Cl. ....................... 405/184.2; 405/184; 138/98
(58) Field of Search ........................... 405/184.2, 184.1, 405/184, 154.1; 138/98

(56) References Cited

U.S. PATENT DOCUMENTS

| | | | | |
|---|---|---|---|---|
| 4,334,943 A | * | 6/1982 | Zenbayashi et al. ........ | 156/287 |
| 4,368,091 A | * | 1/1983 | Ontsuga et al. ............. | 156/287 |
| 5,077,107 A | * | 12/1991 | Kaneda et al. ............. | 428/36.1 |
| 5,108,228 A | * | 4/1992 | Miyazaki et al. ........ | 405/184.2 |
| 5,205,886 A | | 4/1993 | White | |
| 5,385,173 A | * | 1/1995 | Gargiulo ...................... | 138/98 |
| 5,403,120 A | * | 4/1995 | Stekette, Jr. ............. | 405/184.2 |
| 5,520,484 A | * | 5/1996 | Kamiyama et al. ...... | 405/184.2 |
| 5,525,049 A | * | 6/1996 | Paletta ........................ | 425/335 |
| 5,846,025 A | * | 12/1998 | Kamiyama et al. ...... | 405/184.2 |
| 6,058,978 A | * | 5/2000 | Paletta et al. .................. | 138/98 |
| 6,138,718 A | * | 10/2000 | Maimets ...................... | 138/98 |
| 6,240,965 B1 | * | 6/2001 | Maimets ...................... | 138/98 |

FOREIGN PATENT DOCUMENTS

| | | |
|---|---|---|
| DE | 4403 370 A1 | 8/1995 |
| EP | 0370108 | * 5/1990 |
| EP | 0676579 | * 10/1995 |

* cited by examiner

*Primary Examiner*—Frederick L. Lagman
(74) *Attorney, Agent, or Firm*—O'Melveny & Myers LLP

(57) ABSTRACT

A process for the laying of high pressure fluid pipelines is described, in which the existing fluid pipelines of different nominal pressure stages are used in order to provide a new assembled high pressure fluid pipeline of a standardized and higher nominal pressure stage. This is achieved by inserting a woven fabric hose of a correspondingly higher nominal pressure stage into the existing old fluid pipeline according to the woven fabric hose relining process.

13 Claims, 2 Drawing Sheets

METHOD FOR LAYING PIPES FOR FLUID UNDER HIGH PRESSURE

BACKGROUND OF THE INVENTION

The invention deals with a process for the laying of high pressure fluid pipelines, particularly gas pipelines, inside already existing old fluid pipelines.

High pressure fluid pipelines in the form of gas pipelines are running throughout the country and are linked at many points in the manner of a grid. Some of the gas pipelines feature different nominal pressure stages between sub-mains or connecting points thus calling for pressure reduction or compressor stages between the various pipelines of different nominal pressure stages. This obviously renders these installations more expensive and, further-more, the throughput is restricted by the pipeline section of the lowest nominal pressure. The conversion of pipelines of different nominal pressure stages to a standardised higher nominal pressure stage is relatively expensive because the pipeline sections of an excessively low nominal pressure stage have to be completely laid anew.

The so called woven fabric hose relining process is used for the restructuring of gas pipe-lines, for example as known from DE-A-44 03 370. For this purpose, a woven fabric hose—a so called inliner—with resin impregnated inner coating is turned inside out and inserted into the gas pipeline to be restructured, in such a manner that the resin impregnated coating is now on the outside. With the aid of the application of pressure, the resin impregnated outer coat adheres to the inside of the old fluid pipeline. Gas pipelines of a given nominal pressure stage are thus restructured, in such a manner that the restructured gas pipeline is once again of the identical or lower nominal pressure stage.

A woven fabric hose relining process is also known from U.S. Pat. No. 5,205,886, by which an inliner is inserted into an existing pipeline. The inliner consists of several coats of a tension and tear proof outer coating made of woven fabric. All coatings of the inliner are elastic and expandable, in such a manner that the inserted inliner can be expanded with the aid of a fluid and brought into close contact with the inner wall of the pipeline. The pressure stability is thus chiefly a function of the old fluid pipeline.

The object of the present invention consists of a process for the laying of high pressure fluid pipelines, which is simpler and cheaper.

This problem is solved by laying of high pressure fluid pipelines of a given nominal pressure stage inside an already existing old fluid pipeline of an old nominal pressure stage by inserting a woven fabric hose of the given nominal pressure stage into the old fluid pipeline, characterized in that the given nominal pressure stage of the woven fabric hose is higher than the old nominal pressure stage of the old fluid pipeline.

The core of the invention consists of the fact that known processes for the restructuring of pipelines with the aid of woven fabric hose relining can also be used in order to raise the nominal pressure stage of still sound high pressure fluid pipelines. It is thus possible to obtain high pressure fluid pipelines of higher nominal pressure stages, without having to excavate the old fluid pipeline.

According to a preferred embodiment, the inserted woven fabric hose is coated, whereby the type of coating is chosen as a function of the pressures of the gases and fluids conveyed through the high pressure fluid pipeline. According to a further embodiment of the invention, the woven fabric hose of the given nominal pressure stage is inserted into a number of interconnected old fluid pipelines of different nominal pressure stages, whereby the given nominal pressure stage of the woven fabric hose is higher than at least one of the different old nominal pressure stages of the old fluid pipeline.

According to a further preferred embodiment of the invention, the outer diameter of the inserted woven fabric hose approximately equals the inner diameter of the old fluid pipeline, in such a manner that no volume is wasted. An important feature is the fact that the outer fluid pipeline does not have to absorb the new nominal pressure, in other words does not have to assume a supporting function. The new higher nominal pressure is fully guaranteed by the stability of the woven fabric. All high strength materials and, particularly, aramid fibers such as those sold under the trademark KEVLAR®, are suitable materials for the woven fabric hose.

In accordance with a further preferred embodiment, the woven fabric hose is inserted into the old fluid pipeline according to the woven fabric hose relining process. It is thus possible to make use of the devices and processes known from the woven fabric relining process when laying high pressure fluid pipelines in accordance with the present invention. invention.

According to an embodiment of the invention, the coating of the fabric hose consists of plastic. Whether or not the coating is plastic, the fabric hose may be coated on the inside and/or outside.

Further details, features and advantages presented by the invention are shown by the description below of a preferred embodiment of the invention, with the aid of the drawings.

DETAILED DESCRIPTION

Figure 1:
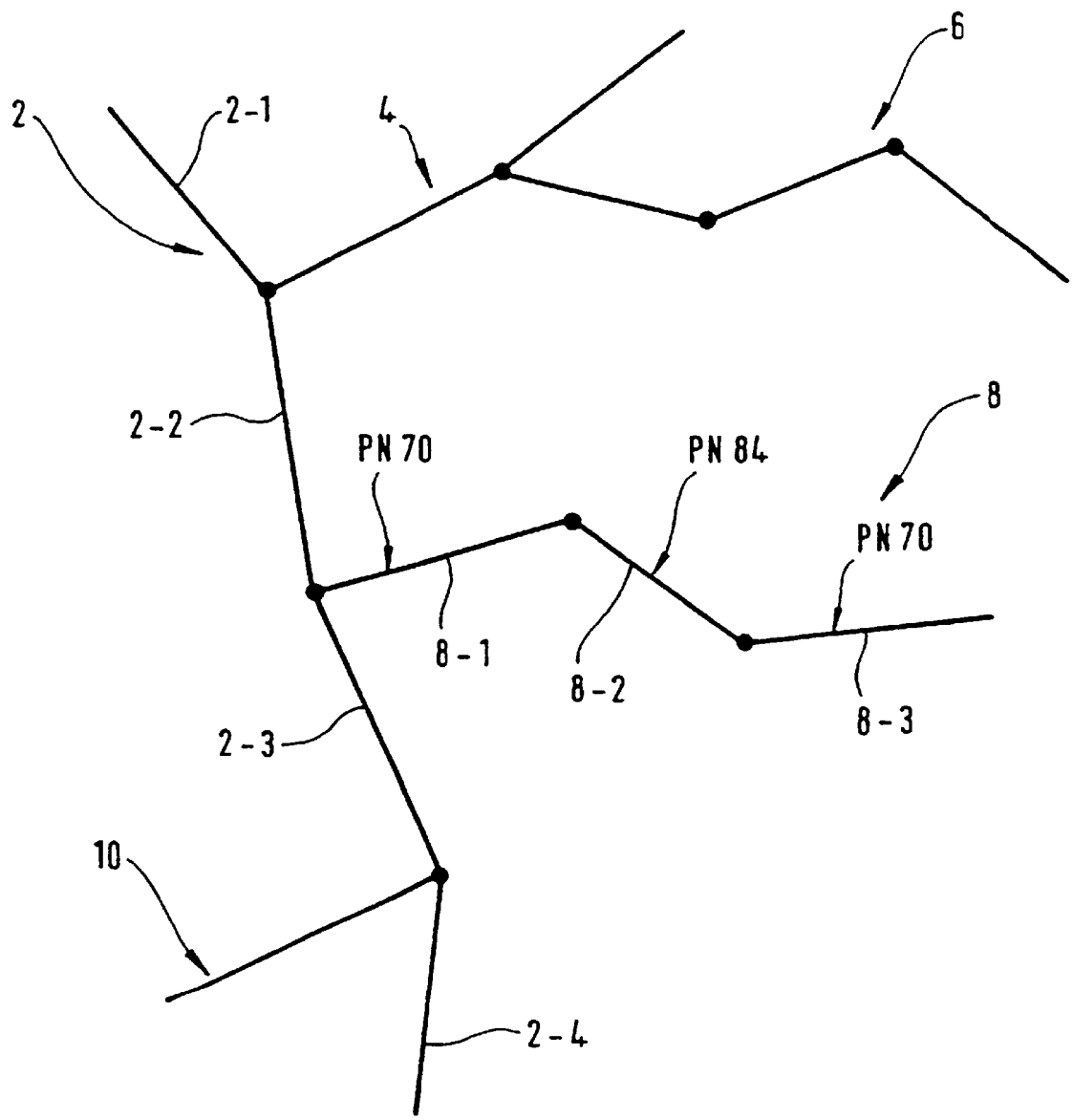
FIG. 1 shows a diagrammatic view of a gas grid of different pipeline sections whose nominal pressure stages vary.

FIG. 1 shows a high pressure gas pipeline grid of different interconnected high pressure gas pipelines 2, 4, 6, 8 and 10 composed of different high pressure gas pipeline sections 2-i etc.

Figure 2:
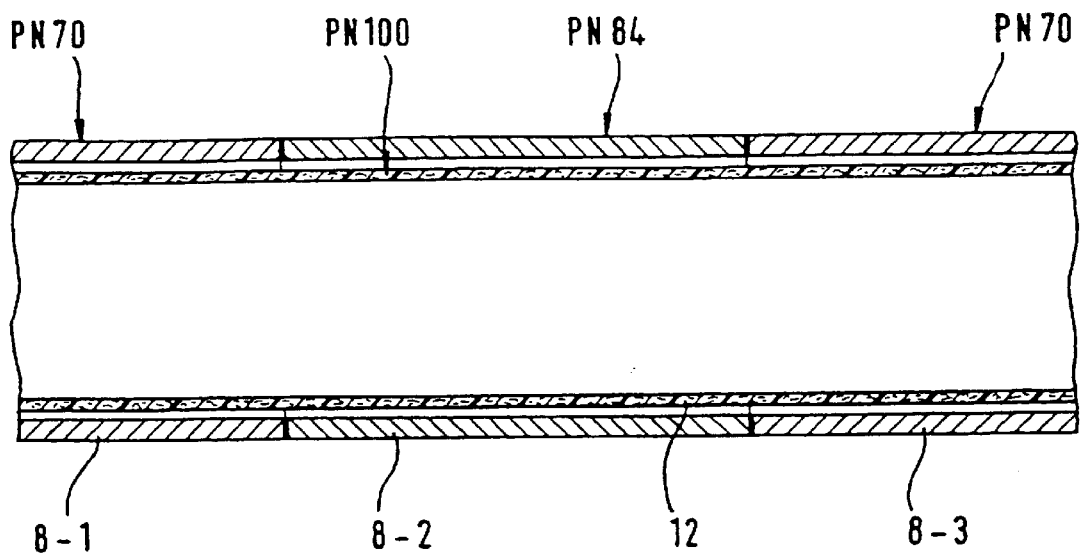
FIG. 2 shows a diagrammatic view of interconnected old fluid pipelines of different old nominal pressure stages and inserted woven fabric hose of a given higher nominal pressure stage.

FIG. 2 shows a diagrammatic view of gas pipeline 8 with various interconnected sections 8-1, 8-2 and 8-3, into which a woven fabric hose 12 is inserted in accordance with the inline process. The various pipeline sections 8-1, 8-2 and 8-3 are laid out successively for nominal pressure stages, old nominal pressure stages, ie. without inserted woven fabric hose, of PN70, PN 84 and PN70. By inserting a woven fabric hose 12 of a nominal pressure stage of PN100, the high pressure fluid pipeline 8 of pressure stages PN70, PN84 and PN70 becomes a high pressure pipeline of the standardised higher nominal pressure stage of PN100.

This makes it possible considerably to increase the gas throughput and, furthermore, to use the whole of pipeline 8 as a so called pressure buffer, ie as a storage container for gas, to enable peak gas consumption to be met in a more convenient manner.

Figure 3:
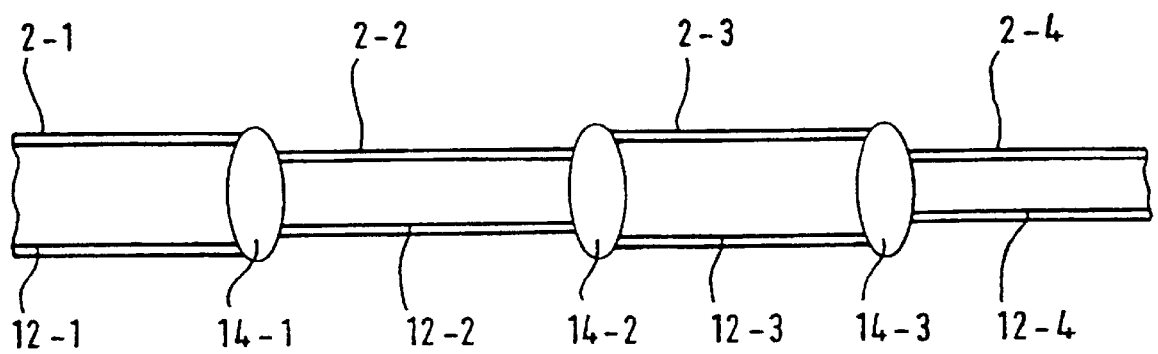
FIG. 3 shows a diagrammatic view of interconnected old fluid pipelines of different old nominal pressure stages, different pipe diameters and inserted woven fabric hoses of a given higher nominal pressure stage.

FIG. 3 shows a diagrammatic view of pipeline 2 of FIG. 1 which, in addition to sub-mains 14-1 to 14-3, consists of pipeline sections 2-1 to 2-4 of different pipe diameters and different old nominal pressure stages. In such a case, too, the process according to the invention makes it possible to provide a pipeline of standardised nominal pressure stage, for example nominal pressure stage 100. However, in view of sub-mains 14-i, it is necessary here to insert different woven fabric hoses 12-1, 12-2, 12-3 and 12-4 of different nominal diameters. Whilst it would be possible in principle to insert into an old pipeline of a given diameter a woven fabric hose of a smaller diameter, it is preferable to adapt the outer diameter of the new woven fabric hose 14 to be inserted to the inner diameter of the old pipeline, thus preventing any dead volume.

REFERENCE DRAWINGS 2 high pressure gas pipeline
4 high pressure gas pipeline
6 high pressure gas pipeline
8 high pressure gas pipeline
10 high pressure gas pipeline
2-i high pressure gas pipeline section
8-i high pressure gas pipeline section
12-i woven fabric hoses
14-i sub-mains

What is claimed is:

1. Process for the laying of high pressure fluid pipelines of a given nominal pressure stage inside an already existing old fluid pipeline of an old nominal pressure stage by inserting a woven fabric hose of the given nominal pressure stage into the old fluid pipeline, characterised in that the given nominal pressure stage of the woven fabric hose is higher than the old nominal pressure stage of the old fluid pipeline.

2. Process according to claim 1, characterised in that the woven fabric hose is coated on the inside and/or outside.

3. Process according to claim 2, characterised in that the coating consists of plastic.

4. Process according to claim 1, characterised in that the outer diameter of the woven fabric hose approximately equals inner diameter of the old fluid pipeline.

5. Process according to claim 1, wherein the woven fabric hose of the given nominal pressure stage is inserted into the old fluid pipeline according to a woven fabric hose relining process.

6. Process for the laying of high pressure fluid pipelines according to claim 1, characterised in that the woven fabric hose of the given nominal pressure stage is inserted into a number of interconnected old fluid pipelines of different old nominal pressure stages, whereby the given nominal pressure stage of the woven fabric hose is higher than at least one of the different old nominal pressure stages of the old fluid pipeline.

7. For a high-pressure fluid pipeline comprising at least two stages, a first of the at least two stages for conveying a fluid at a first nominal pressure, and a second of the at least two stages for conveying the fluid at a second nominal pressure, wherein the first nominal pressure is greater than the second nominal pressure, a method for increasing the throughput of the fluid pipeline, the method comprising the steps of:

selecting a flexible hose capable of conveying the fluid at a desired nominal pressure not less than the first nominal pressure, wherein the flexible hose, when conveying the fluid at the desired nominal pressure and being unconstrained from expansion, has an outer diameter not greater than a minimum inner diameter of the pipeline; and inserting the flexible hose through the high-pressure fluid pipeline, whereby the flexible hose is capable of conveying the fluid through the pipeline at the desired nominal pressure.

8. The method of claim 7, wherein the selecting step further comprises selecting the flexible hose comprising a woven fabric hose.

9. The method of claim 7, wherein the selecting step further comprises selecting the flexible hose comprising an aramid fiber material.

10. The method of claim 7, wherein first nominal pressure is a maximum nominal pressure for the pipeline, and wherein the selecting step further comprises selecting the flexible hose capable of conveying the fluid at the desired nominal pressure substantially greater than the first nominal pressure.

11. The method of claim 7, wherein the selecting step further comprises selecting the flexible hose coated on the inside and/or outside with a resin.

12. The method of claim 7, wherein the selecting step further comprises selecting the flexible host having the outer diameter substantially equal to the minimum equal diameter of the pipeline.

13. The method of claim 7, wherein the inserting step further comprises inserting the flexible hose into the pipeline according to a woven fabric hose relining process.

* * * * *

UNITED STATES PATENT AND TRADEMARK OFFICE
CERTIFICATE OF CORRECTION

PATENT NO.    : 6,554,539 B1
DATED         : April 29, 2003
INVENTOR(S)   : Josef Radlinger et al.

It is certified that error appears in the above-identified patent and that said Letters Patent is hereby corrected as shown below:

<u>Title page,</u>
Item [73], second assignee's name should be corrected to read -- VNG-Verbundnetz Gas AG --

Signed and Sealed this

Twenty-first Day of October, 2003

JAMES E. ROGAN
*Director of the United States Patent and Trademark Office*